(No Model.) 2 Sheets—Sheet 1.
T. W. LANGILL.
COMBINED VAULT COVER AND VENTILATOR.
No. 289,663. Patented Dec. 4, 1883.
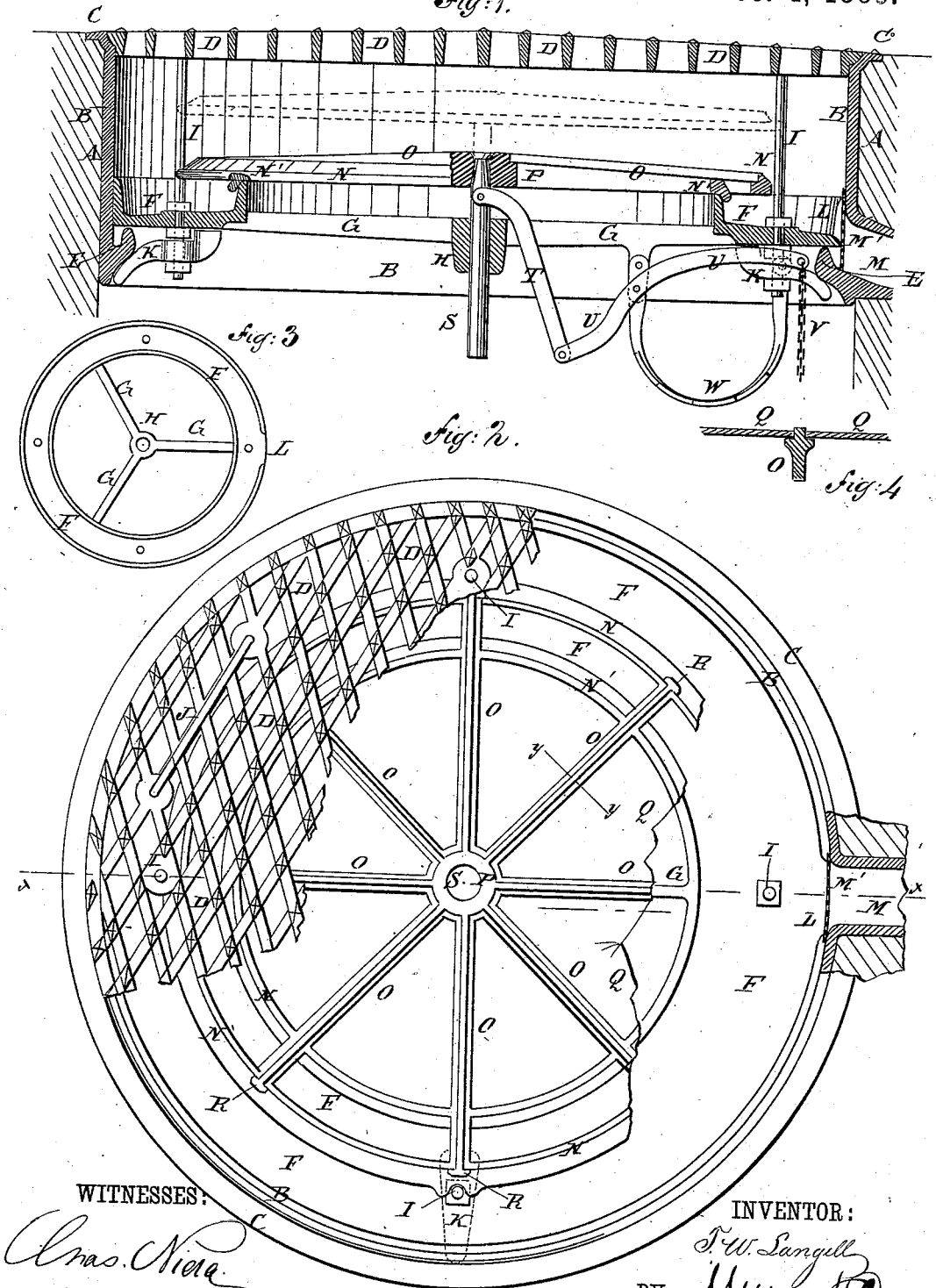
WITNESSES:
Chas. Niera
C. Sedgwick
INVENTOR:
T. W. Langill
BY Munn & Co
ATTORNEYS.

(No Model.) 2 Sheets—Sheet 2.

T. W. LANGILL.
COMBINED VAULT COVER AND VENTILATOR.

No. 289,663. Patented Dec. 4, 1883.

WITNESSES:
Chas Nida
C. Sedgwick

INVENTOR:
T. W. Langill
BY Munn & Co
ATTORNEYS.

N. PETERS. Photo-Lithographer. Washington. D. C.

UNITED STATES PATENT OFFICE.

T. WESLEY LANGILL, OF NEW YORK, N. Y.

COMBINED VAULT-COVER AND VENTILATOR.

SPECIFICATION forming part of Letters Patent No. 289,663, dated December 4, 1883.

Application filed November 6, 1883. (No model.)

*To all whom it may concern:*

Be it known that I, T. WESLEY LANGILL, of the city, county, and State of New York, have invented a new and useful Improvement in Combined Vault-Covers and Ventilators, of which the following is a full, clear, and exact description.

Reference is to be had to the accompanying drawings, forming a part of this specification, in which similar letters of reference indicate corresponding parts in all the figures.

Figure 5:
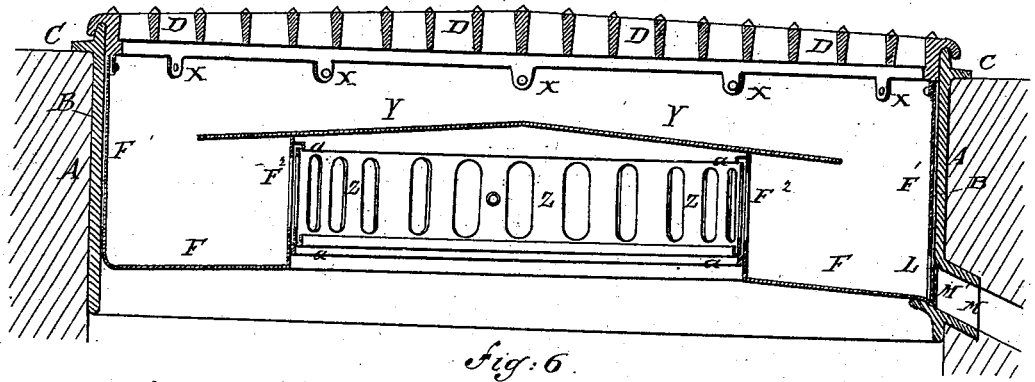
Figure 6:
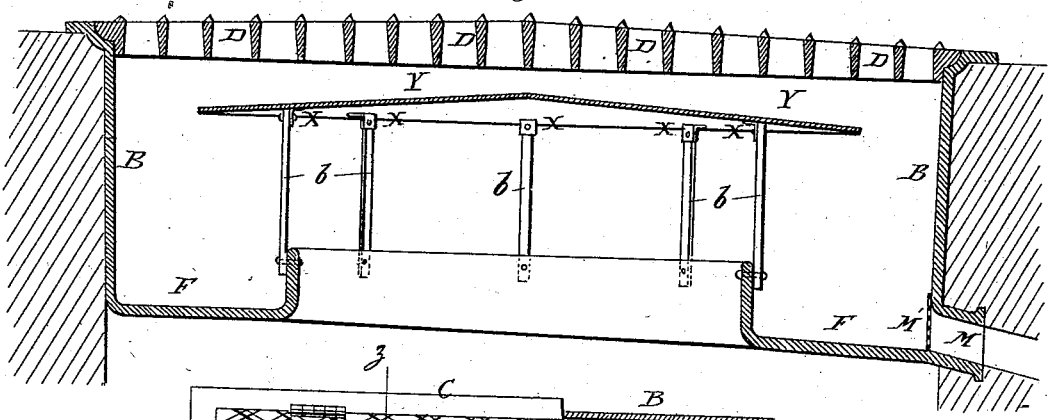
Figure 7:
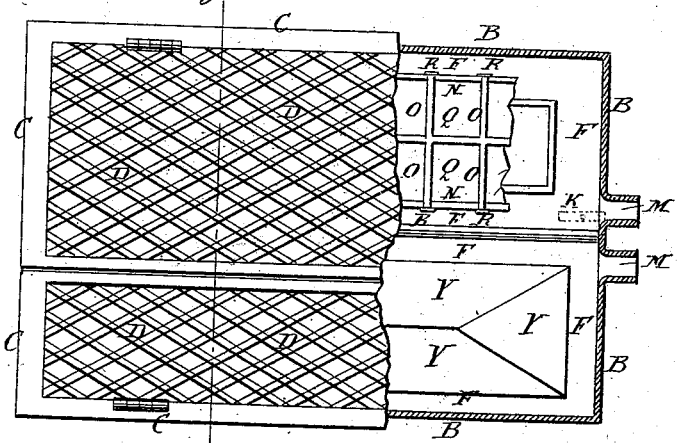
Figure 8:
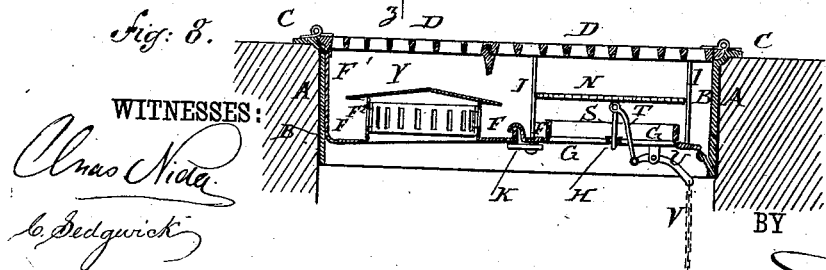

Figure 1, Sheet 1, is a sectional elevation of my improvement, taken through the line $x\ x$, Fig. 2. Fig. 2, Sheet 1, is a plan view of the same, parts being broken away. Fig. 3, Sheet 1, is a plan view of the water-receiving channel-plate on a reduced scale. Fig. 4, Sheet 1, is a sectional elevation of a bar of the glass-receiving frame, taken through the line $y\ y$, Fig. 2. Fig. 5, Sheet 2, is a sectional elevation of a modified form of my improvement. Fig. 6, Sheet 2, is a sectional elevation of another modification of my improvement. Fig. 7, Sheet 2, is a plan view, partly in section and part being broken away, of another modified form of my improvement. Fig. 8, Sheet 2, is a sectional end elevation of the same, taken through the line $z\ z$, Fig. 7.

The object of this invention is to provide vault-covers constructed in such a manner that they can be used as ventilators to ventilate the chamber over which they may be placed, and which will carry off any water that may enter the openings in which the said covers are placed.

The invention consists in a combined vault-cover and ventilator made with a grated top, a water-receptacle beneath the grating, a cover fitted within the vault-opening, and to shed water into the water-receptacle, and a discharge pipe or outlet to carry the water from the receptacle.

The invention consists, also, in a combined vault-cover and ventilator constructed with a casing having a grate at its upper end and a water-receiving channel-plate at its lower end, and a cover resting upon the inner flange of the said channel-plate, and provided with a sliding rod, a connecting-bar, and a lever, whereby the water received upon the cover will flow into the channel-plate, and the said cover can be readily raised and lowered. The grate and the water-receiving channel-plate are connected by rods, and are provided with buttons, so that the channel-plate and its attachments can be raised from the casing by raising the said grate, and the grate, channel-plate, and cover can be locked in place, as will be hereinafter fully described.

Referring to Figs. 1 to 4, inclusive, A represents an opening through a sidewalk or other structure into a vault or chamber, and which is to be provided with a cover.

B is a suitable casing fitting into the opening A, and having an outwardly-projecting flange, C, around its upper edge, to rest in a rabbet formed around the opening A, and thus support the casing B and its attachments. The inner side of the upper edge of the casing B is beveled, flared, or rabbeted to form a seat for the top grating, D, and firmly support the said grating in such a position that its upper surface will be flush with or but a little above the surface of the sidewalk.

Upon the lower part of the casing B is formed an inwardly-projecting flange, E, for the water-receiving channel-plate F to rest upon. The channel-plate F fits snugly into the interior of the casing B, and is strengthened by three or more ribs, G, radiating from a central hub, H, and cast in one piece with the said channel-plate and hub. The channel-plate F is connected with the grating D by four (more or less) rods, I, the upper ends of which are riveted or otherwise firmly secured to the said grating D. The lower ends of the rods I pass through the channel-plate F and have nuts screwed upon them above and below the said channel-plate, so that the channel-plate F and its attachments can be raised from the casing B by raising the grating D. The grating D is provided with handles J, for convenience in inserting it in and raising it from the casing B.

To the lower ends of the rods I are pivoted buttons K, which are secured in place upon the said rods by nuts, as shown in Fig. 1. The buttons K are so formed that one end will rest against the lower side of the flange E and the other end against the lower side of the inner part of the channel-plate F. The buttons K lock the channel-plate F and grating D in place, and must be turned to one side when the said channel-plate and grating are to be raised from the casing B. The outer flange of the channel-plate F is cut away at one point, as shown at L in Figs. 1, 2, and 3, to allow the water received in the said channel to flow out into a pipe, M, through which it flows into the sewer or other suitable receptacle. The mouth of the pipe M or the discharge-opening in the flange of the channel-plate F is closed with a screen of wire-cloth, M', or other suitable material, to prevent coarse refuse that may fall upon the cover and channel-plate from entering the pipe M and choking it.

Upon the upper edge of the inner flange of the channel-plate F rests a suitable frame, formed of a rim, N, connected by supporting-arms O with a central hub, P. The opposite sides of the upper edges of the said arms O are rabbeted to form seats for the glass plates Q, which are kept from slipping out of the said seats by cross-heads R, formed upon the outer ends of the said arms O.

Upon the arms O is formed a second rim, N', in such a position as to rest and fit upon the upper edge of the inner flange of the channel-plate F, so as to prevent air or water from passing between the said rim and flange. The top of the rim N' is flush with the shoulders of the rabbeted arms O, so that the glass plates Q will fit snugly upon the said rim. The frame N O P is made higher at the center, and inclines downward toward its outer edge, so that the water that falls through the grating D upon the glass plates Q will readily flow into the channel of channel-plate F.

To the hub P is riveted or otherwise securely attached the upper end of a rod, S, which passes down through the hub H, and to it, between the hubs P H, is pivoted the upper end of a connecting-bar, T, the lower end of which is pivoted to the end of the lever U. The lever U is pivoted to a support formed upon or attached to an arm, G.

To the free end of the lever U is attached the end of a chain, V, which hangs in such a position that it can be readily reached and operated by a person standing upon the floor of the vault.

With this construction, by operating the lever U, the frame N N' O P will be raised above the flange of the channel-plate F, so that air can pass freely between the said flange and frame to ventilate the vault or chamber over which the cover is placed, as indicated in dotted lines in Fig. 1. The outer part of the lever U moves along the toothed side of the bar W, attached to the arm G, channel-plate F, rod I, or other suitable support, so that the lever U and frame or cover N N' O P will be held securely in any position into which they may be adjusted.

It is obvious that the vault-cover and ventilator constructed substantially as above described may have round, square, or any other general form, and that the vertically-adjustable water-shedding cover may be made of metal, glass, wood, or other material or combination of materials, and so as to be opaque or transparent, as desired.

In the modification shown in Fig. 5 the flange E of the casing B is omitted, and the outer flange, F', of channel-plate F is extended up to the grate D, and is riveted to lugs X, formed upon the said grate. In this case, also, the inner flange, F², of the channel-plate F is extended upward, and has a cover, Y, attached to its upper edge. Upon the inner side of the flange F² is placed a band or plate, Z, which slides in guides $a$, attached to the said flange F². The flange F² and the plate Z have corresponding slots formed in them to serve as ventilating-openings, so that the passage of air may be prevented or permitted, as may be desired.

In the modification shown in Fig. 6 the casing B and the channel-plate F are made in one piece, and the cover Y is supported by uprights $b$, attached at their lower ends to the inner flange of the said channel-plate F and at the upper ends to the said cover Y. The cover shown in Fig. 5 is intended for use over vaults to which access is desired through the vault-openings, and the grating D, the connected water-receiving channel-plate F, and the ventilating and water-shedding cover Y are raised together from the vault-opening. The ventilating-cover shown in Fig. 6 is intended for use over vaults to which access through the vault-openings is not desired.

In Figs. 7 and 8 the constructions shown in Figs. 1, 5, and 6 are shown as used in the same opening. In this case the grate D is made in two parts, one larger than the other, and both hinged at their outer edges, so that the larger part of the said grate and its attachments can be turned back out of the way; or both parts can be turned back, as may be desired.

Having thus described my invention, I claim as new and desire to secure by Letters Patent—

1. A combined vault-cover and ventilator, constructed substantially as herein shown and described, and consisting of a suitably-supported grated top, a water-receptacle fitted below the grated top, a cover fitted over the water-receptacle to shed water thereto, and a discharge pipe or outlet to carry the water from said receptacle, as set forth.

2. A combined vault-cover and ventilator constructed substantially as herein shown and described, and consisting of the casing B, grate D, channel-plate F, cover N N' O P, and mechanism for raising the cover, as set forth.

3. In a combined vault-cover and ventilator, the combination, with the channel-plate F, of the cover-frame N O P, provided with the second rim, N', substantially as herein shown and described.

4. In a combined vault-cover and ventilator, the combination, with the casing B, having pipe M, and the cover N N' O P, of the water-receiving channel-plate F, having discharge-opening L, substantially as herein shown and described, whereby the water received upon the cover will be conducted to the sewer, as set forth.

5. In a combined vault-cover and ventilator, the combination, with the casing B, the grating D, and the water-receiving channel-plate F, of the rods I and buttons K, substantially as herein shown and described, whereby the said grating and channel-plate will be locked in place, and the channel-plate can be lifted out of the casing by raising the grating, as set forth.

6. In a combined vault-cover and ventilator, the combination, with the cover N N' O P and the water-receiving channel-plate F, having arms G and hub H, of the sliding rod S, the connecting-bar T, and the lever U, substantially as herein shown and described, whereby the said cover can be readily raised and lowered, as set forth.

T. WESLEY LANGILL.

Witnesses:
JOHN McCALMAN,
WILLIAM HORNE.